United States Patent [19]

Marino et al.

[11] Patent Number: 5,732,054
[45] Date of Patent: Mar. 24, 1998

[54] COMBINED TRACKING POSITION AND TILT SENSOR FOR OPTICAL RECORDING ACTUATOR

[75] Inventors: Philip Frank Marino; Charles Jarratt Simpson, both of Rochester, N.Y.

[73] Assignee: Eastman Kodak Company, Rochester, N.Y.

[21] Appl. No.: 746,505

[22] Filed: Nov. 12, 1996

Related U.S. Application Data

[63] Continuation of Ser. No. 412,487, Mar. 28, 1995, abandoned.

[51] Int. Cl.⁶ ........................................ G11B 7/00
[52] U.S. Cl. .............................. 369/54; 369/44.32
[58] Field of Search .................... 369/44.32, 44.24, 369/54, 44.23, 117, 118; 250/201.1; 359/813–814

[56] References Cited

U.S. PATENT DOCUMENTS

| | | |
|---|---|---|
| 4,589,103 | 5/1986 | Tajima . |
| 4,608,680 | 8/1986 | Yano |
| 4,638,471 | 1/1987 | van Rosmalen ............... 369/44.24 |
| 4,727,529 | 2/1988 | Araki et al. . |
| 4,779,256 | 10/1988 | Koike et al. ................... 369/44.32 |
| 5,124,973 | 6/1992 | Igata ............................. 369/44.32 |
| 5,136,558 | 8/1992 | Getreuer et al. ............... 369/44.15 |
| 5,142,516 | 8/1992 | Fennema ........................ 369/44.28 |
| 5,172,355 | 12/1992 | Nagahara et al. .............. 369/44.32 |
| 5,182,739 | 1/1993 | Kime et al. .................... 369/44.32 |
| 5,206,848 | 4/1993 | Kusano et al. ................. 369/44.41 |
| 5,216,649 | 6/1993 | Koike et al. ................... 369/44.23 |
| 5,218,597 | 6/1993 | Yabe .............................. 369/118 |
| 5,235,574 | 8/1993 | Aviles et al. .................. 369/32 |
| 5,321,678 | 6/1994 | Takishima et al. ............. 369/44.14 |
| 5,430,699 | 7/1995 | Matsubara et al. ............ 369/54 |

FOREIGN PATENT DOCUMENTS

| | | |
|---|---|---|
| 61-57081 | 3/1986 | Japan ........................... 369/44.24 |
| 62-167624 | 7/1987 | Japan . |
| 1-312744 | 12/1989 | Japan . |
| 4-95279 | 3/1992 | Japan ........................... 369/44.24 |

*Primary Examiner*—W. R. Young
*Attorney, Agent, or Firm*—Raymond L. Owens

[57] ABSTRACT

A combined sensor for measuring tilt and tracking position of a lens holder with respect to an optical recording actuator base is disclosed. A light source and two photosensitive bi-cell detectors are secured to the actuator base so that a beam from the light source strikes the detectors, and an optical slot or flag is secured to the lens holder between the light source and the detectors, for creating an image on the bi-cell detectors. Output from the bi-cell detectors is converted into information on tilt and position of the lens holder relative to the actuator base.

13 Claims, 5 Drawing Sheets

COMBINED TRACKING POSITION AND TILT SENSOR FOR OPTICAL RECORDING ACTUATOR

CROSS REFERENCE TO RELATED APPLICATION

This is a continuation of application Ser. No. 08/412,487, filed Mar. 28, 1995, now abandoned.

FIELD OF THE INVENTION

The present invention relates to a an optical recording actuator for an optical disc storage device. More particularly, the invention relates to a combined sensor for sensing the tilt and fine tracking position of a lens holder in an optical recording actuator.

DESCRIPTION OF THE PRIOR ART

Optical disc recording devices typically contain an optical recording actuator to fine-control the lens position relative to the rotating disc. Fine positioning of the lens is necessary because of unavoidable warp of the disc, spindle errors, and other mechanical and optical imperfections. The actuator must control both focus, in the direction normal to the disc surface, and fine tracking, in the direction of a radius of the disc. The entire optical recording actuator, in turn, can be rapidly indexed radially across the tracks of the disc by a tracking access carriage, to allow reading and writing across the entire disc surface.

The optical recording actuator comprises a base, a lens holder, flexures or other means for movably mounting the lens holder in the base, force generating means for deflecting the flexures to move the lens holder within the base, and sensors for measuring the lens holder position. The force generating means are typically electromagnetic motors, such as those disclosed in U.S. patent application No. 08/327,533, filed Oct. 21, 1994, now abandoned, and assignee as the present application.

An example of a typical sensor contained in an optical recording actuator is disclosed in U.S. Pat. No. 5,136,558. This sensor consists of a light source mounted to the base, an aperture in the lens holder to form an image from the light source, and a multiple-element optical detector mounted to the base. The image is projected onto the optical detector. A change in the position of the lens holder moves the image on the optical detector. The output from the optical detector is used to determine the change in position of the lens holder. The output from this sensor provides information on the position of the lens holder with respect to the base.

The tilt alignment of the optical axis of the lens to the disc must be maintained accurately for an optical recording system to function properly. Optical disc tracks are typically 1.2µ wide; the permissible tracking error of the optical recording actuator is less than 0.1µ. Tilting of the optical recording lens can cause degradation of the lens performance and reduced recording quality.

Static errors in lens alignment can result from misalignment of the lens in the actuator and misalignment of the actuator in the writer. These tilt errors are typically addressed by maintaining the necessary tolerances in the manufacturing process. More problematic are dynamic motion errors caused by inertial tilting of the lens holder as it is accelerated and decelerated within the actuator base to maintain focus and tracking relative to the moving disc. Dynamic motion errors have become increasingly significant as the speed of the optical recording actuator has increased.

Actuator tilt sensors, as described here, can be used to reduce lens tilt and improve actuator performance. The error signals from these devices can be used to correct rotation about an axis tangent to a disc track, or roll, and rotation about an axis parallel to a disc radius, or pitch. In order to utilize these tilt sensing devices, the actuator motor must be capable of controlling the roll and pitch motions of the actuator. Such a motor is described in U.S. patent application No. 08/327,533, filed Oct. 21, 1994, and assigned to the same assignee as the present application.

U.S. Pat. No. 4,638,471 to van Rosmalen describes an angular position detection system for an optical scanning unit with a lens holder that reflects the outer periphery of the information pickup beam onto a sensor with annular sector detectors. The system measures lens holder tilt with respect to the actuator base, but is complex and expensive.

One type of tilt sensor measures tilt with respect to the disc surface, but only after the information beam is tracking and focused in an information track. Such systems are described in U.S. Pat. Nos. 5,218,597 to Yabe and 5,206,848 to Kusano. Because these devices require relative stability between the optical recording actuator and the disc, they are ineffective for measuring inertial tilt during rapid actuator movements.

SUMMARY OF INVENTION

A sensor for measuring tilt of a lens holder with respect to an optical recording actuator base is disclosed. The sensor comprises a light source secured to the base, two photosensitive detectors secured to the base in the beam of the light source, and an image mask secured to the moveable lens holder portion of the optical recording actuator for projecting an image in the beam onto the detectors. Output from the detectors is converted into information on tilt in the roll or pitch directions using a processor, logic circuitry, analog circuitry, computer circuitry or any other suitable computing means. Tilt of the lens holder is measured relative to the actuator base. The sensor can simultaneously supply absolute tracking or focus position information, thereby replacing existing tracking or focus position sensors.

DETAILED DESCRIPTION OF THE PREFERRED EMBODIMENTS

Figure 1:
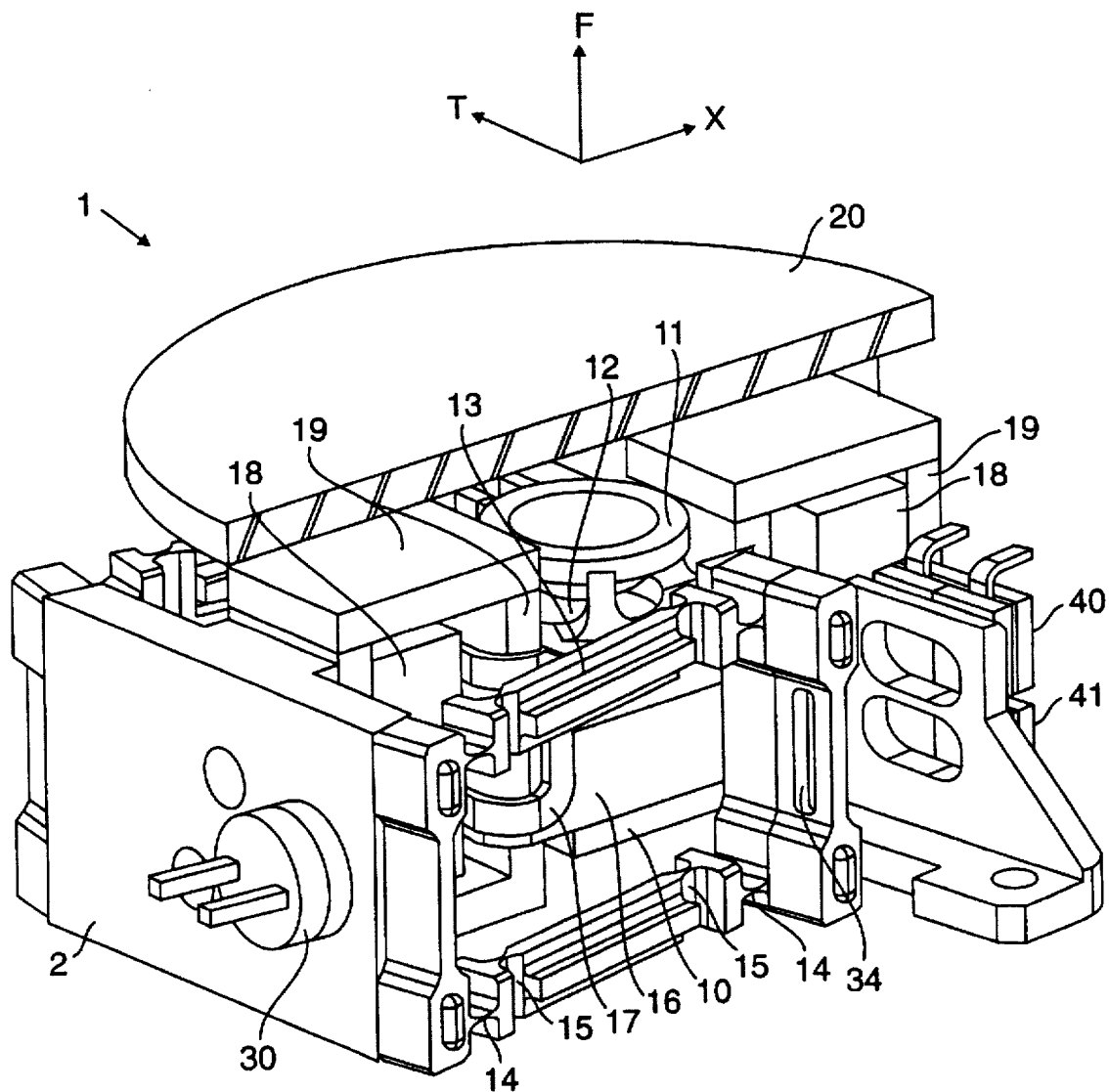
FIG. 1 is a partial perspective view of a combined tracking and tilt sensor according to the present invention mounted in an optical recording actuator.

FIG. 1 is a partial cut-away perspective view of an optical recording actuator with a combined tracking and tilt sensor of the invention. The optical recording actuator 1 comprises an actuator base 2 and a lens holder 10, both molded from a polymer resin. The lens holder has an aperture 12. A glass objective lens 11 is mounted in the lens holder. The objective lens focuses a laser (not shown) on the recording disc 20 for recording information. In the optical recording actuator shown in FIG. 1, the laser is projected from beneath the lens holder 10, through the aperture 12 and objective lens 11, and onto the disc 20, which rotates above the optical recording actuator 1.

The lens holder 10 is mounted to the actuator base 2 on plastic flexures 13 that allow the lens holder to be deflected in two directions: the focusing or vertical direction F, and the tracking or lateral direction T. Each flexure has two flexible segments 14 that allow for motion of the lens holder in the focus direction F, and two flexible segments 15 that allow for motion in the tracking direction T. Positioning forces for moving the lens mount in the focus and tracking directions are provided by coils 16 and 17 respectively, attached to the lens mount 10 and located within magnetic gaps created by magnets 18 and flux returns 19 attached to the actuator base.

FIG. 1 shows the combined tracking and tilt sensor of the invention, which comprises a light emitting diode (LED) 30 mounted to the base 2, an image mask such as slot 34 attached to the lens holder 10, and a pair of photosensitive position detectors 40 and 41 attached to the base 2 in a known manner. While an LED is the currently preferred light source, other light sources could be used. Further, in place of the slot 34, other image masks, such as a flag for casting a shadow, could be used. The combination of a light source, an image mask and a single photosensitive detector comprise a position sensing means that senses the position of a point on the lens holder where the image mask is secured, as explained below.

The sensor of FIG. 1 is oriented to measure roll; that is, the sensor measures rotation about an axis X oriented in a tangential direction to the disc. A sensor of the invention for measuring pitch, or rotation about the tracking or radial direction T, has similar components, but is oriented along an axis of the lens holder 90° from the orientation shown in FIG. 1.

Figure 2:
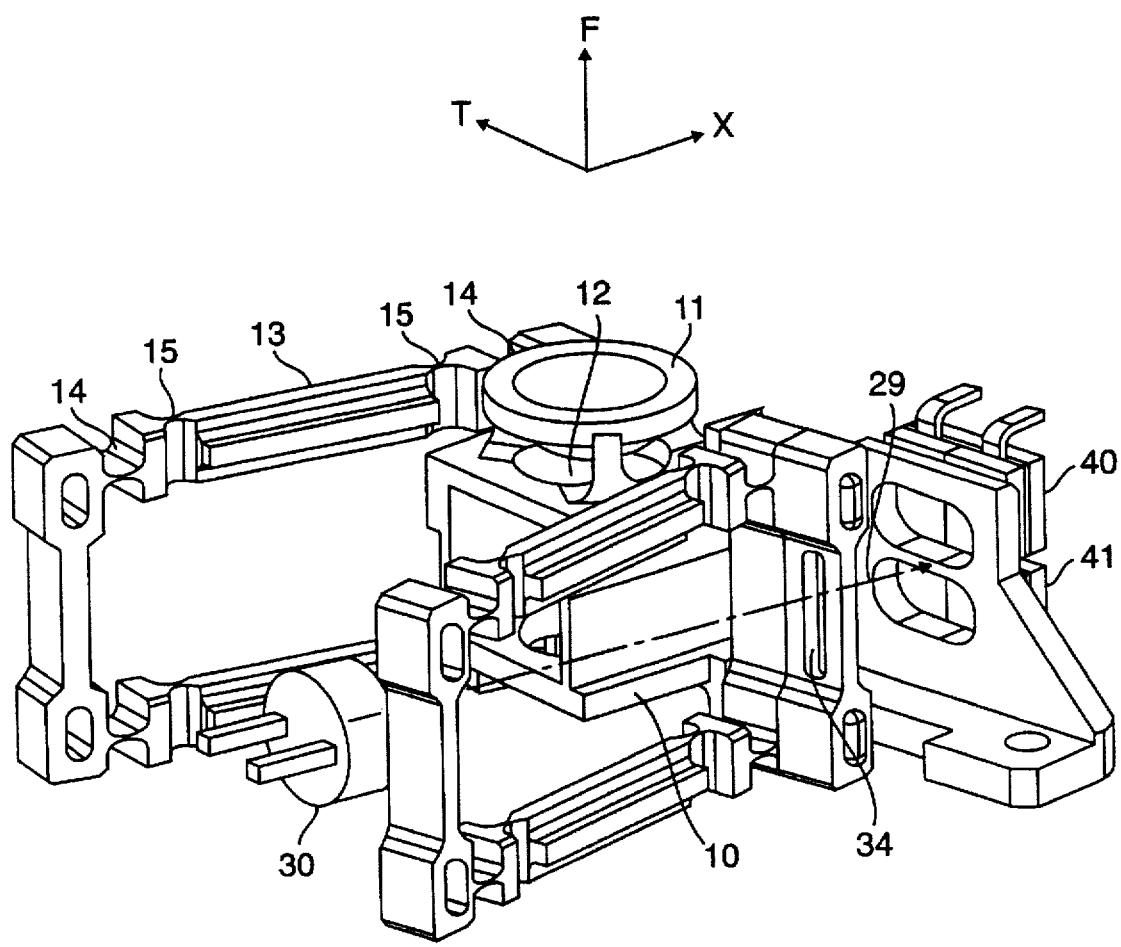
FIG. 2 is a partial perspective view of the combined tracking and tilt sensor of FIG. 1.

FIG. 2 shows the optical recording actuator of FIG. 1 with the base, disc, magnets, coils and other related components removed for clarity. The slot 34 and the detectors 40 and 41 lie in a beam path 29 of the LED 30. LED 30 projects a beam of light in the beam path onto the slot 34, which creates an image on the two detectors 40 and 41. The slot is sufficiently long to include both photosensitive detectors within its shadow. Alternatively, two slots or other image masks could be used to cast separate images on the two detectors.

The slot 34 moves with the lens mount 10 when the mount translates or rotates. Because the LED 30 and the photosensitive detectors 40 and 41 are fixed to the actuator base 2, the image projected by the slot moves on the detectors as the lens holder translates or rotates. As explained below, translation of the lens holder 10 causes the image to move in the same direction on both detectors 40 and 41; rotation causes the image to move in opposite directions on the detectors 40 and 41.

Figure 3A:
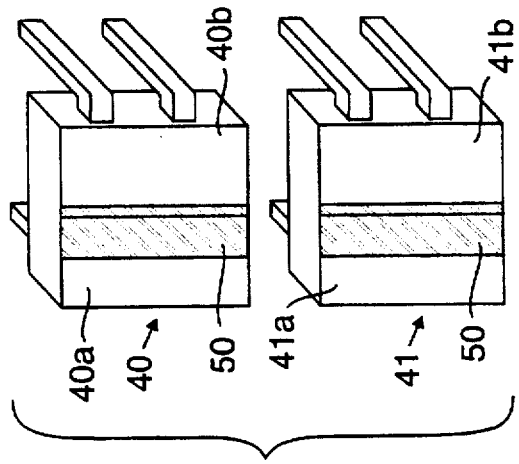
FIGS. 3A through 3D are schematic views of bi-cell detectors according to the present invention.

FIGS. 3A through 3D are schematic views of the detectors 40 and 41 showing a cross-hatched image 50 of the slot 34 projected onto the detectors. While in this example the photosensitive position detectors are bi-cell detectors, other detector configurations could be used. FIG. 3A shows the detectors 40 and 41 with the image of a slot in a system with a lens holder that is properly aligned and positioned with respect to the actuator base. The image 50 of the slot is evenly divided between cells 40a and 40b of detector 40, and evenly divided between cells 41a and 41b of detector 41.

Figure 3B:
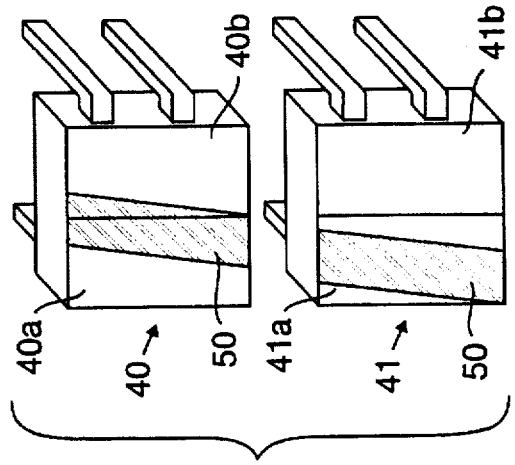
Figure 4:
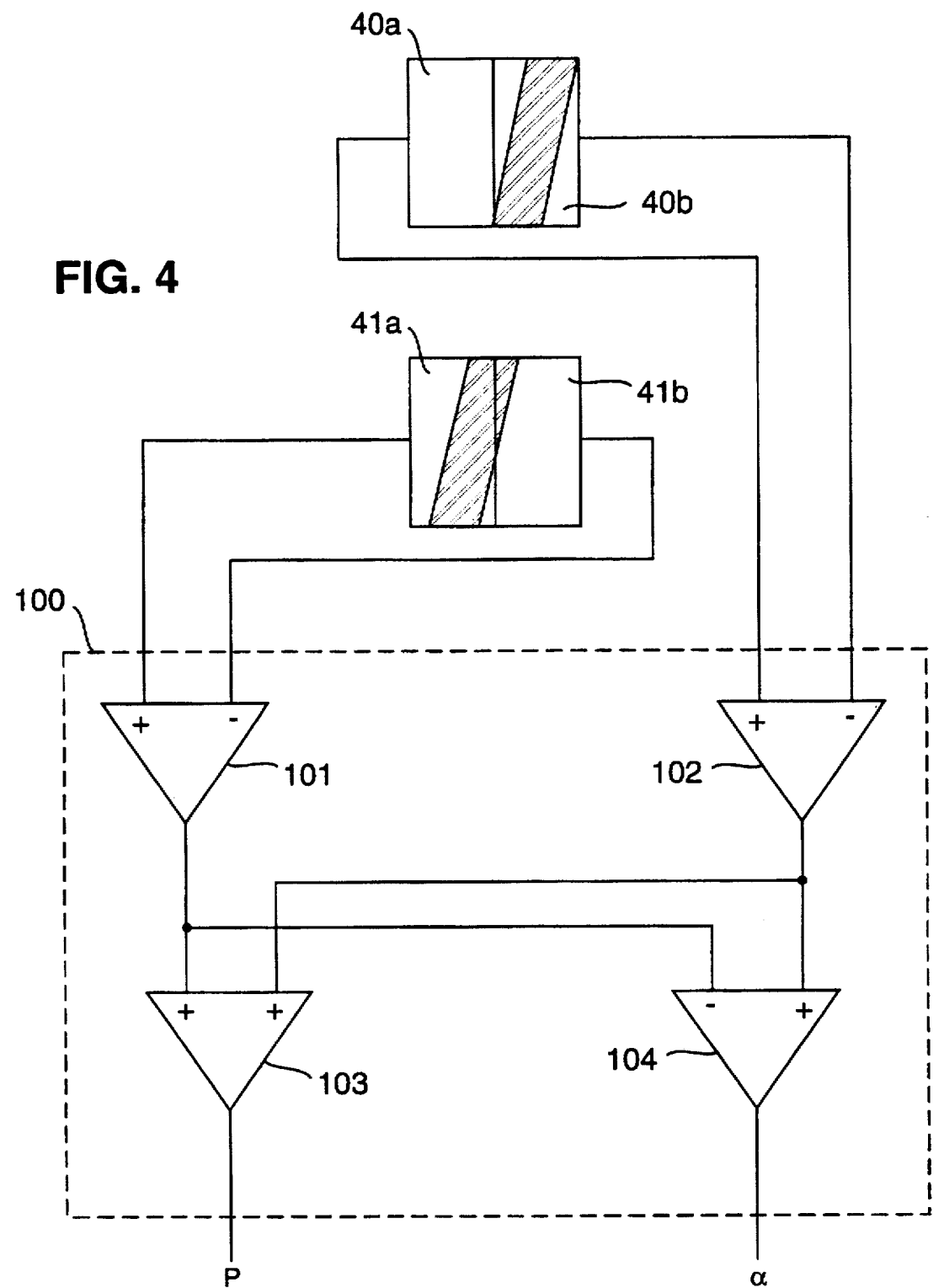
FIG. 4 is a diagram showing computation circuitry according to the invention.

FIG. 3B shows the detectors 40 and 41 with the image of a slot in a system with a lens holder that is tilted with respect to the actuator base. The image 50 of the slot has shifted to the right on detector 40, causing the cell 40b to output a signal indicating a greater light intensity than the cell 40a. Conversely, because of the tilt of the lens holder, the image 50 of the slot has shifted in the opposite direction on detector 41, causing the cell 41a to output a signal indicating a greater light intensity than the cell 41b. A function of the tilt $\alpha$ of the lens holder with respect to the actuator base is computed by subtracting the difference between the outputs of the cells of the second detector from the difference between the outputs of the cells of the first detector. The tilt function $\alpha$ can be determined by the circuit 100 as shown in FIG. 4, using differential amplifiers 101, 102 and 104.

Returning to FIG. 3B, the distance D that the detectors 40 and 41 are spaced apart affects the precision of the tilt measurement. A larger distance D increases the relative movement of the image 50 on the detectors for a given amount of tilt. This permits greater resolution of the tilt function $\alpha$.

In this example, the area shown cross-hatched is the image of the beam as projected through the slot onto the detectors. The output of a cell such as cell 40b in FIG. 3B is therefore increased as the image moves onto the cell. The circuit 100 therefore outputs a negative value for the tilt direction shown in FIG. 3B. In a sensor using a flag casting a shadow, instead of a slot projecting an image, the signs of the output values indicating light intensity are reversed, and the output value for the tilt direction shown in FIG. 3B is positive.

The actual tilt of the lens holder will, in general, be a nonlinear function of the tilt function $\alpha$. The function for determining the actual tilt of the lens holder 10 can be determined based on the geometry of the system, or can be determined experimentally.

Figure 3C:
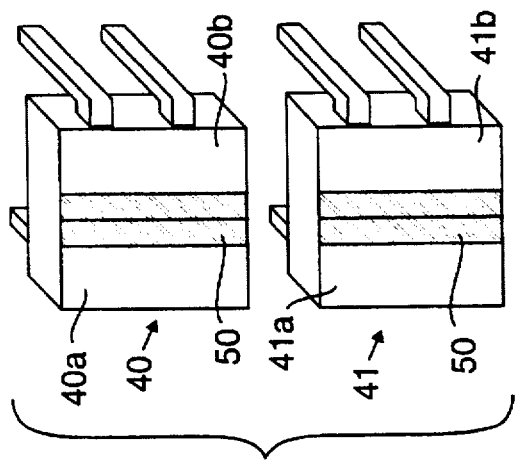

FIG. 3C shows detectors 40 and 41 of a sensor measuring a displacement of the lens holder relative to the actuator base. The image of the slot is displaced in the same direction on both detectors. A function of the position P of the lens holder with respect to the actuator base is computed by adding the difference between the outputs of the cells of the first detector to the difference between the outputs of the cells of the second detector. The position function P is determined by the circuit 100 as shown in FIG. 4, using differential amplifiers 101 and 102, and summing amplifier 103.

Figure 3D:
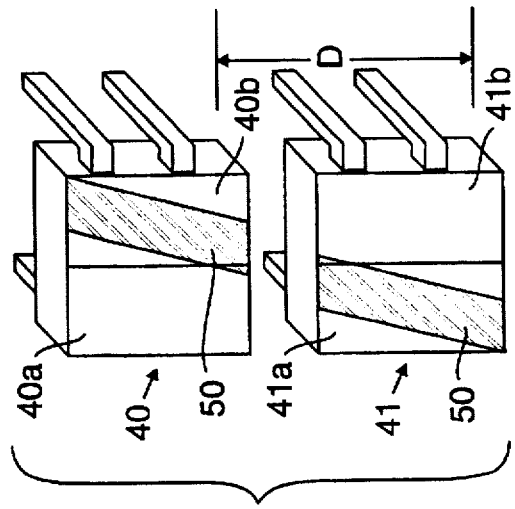

FIG. 3D shows detectors 40 and 41 of a sensor measuring both a displacement and a tilt of the lens holder relative to the actuator base. This is the general case of a combined sensor used to measure tracking position T and roll about the tangential axis X. The position function P and the tilt function $\alpha$ are determined simultaneously by circuit 100 as shown in FIG. 4.

Figure 5:
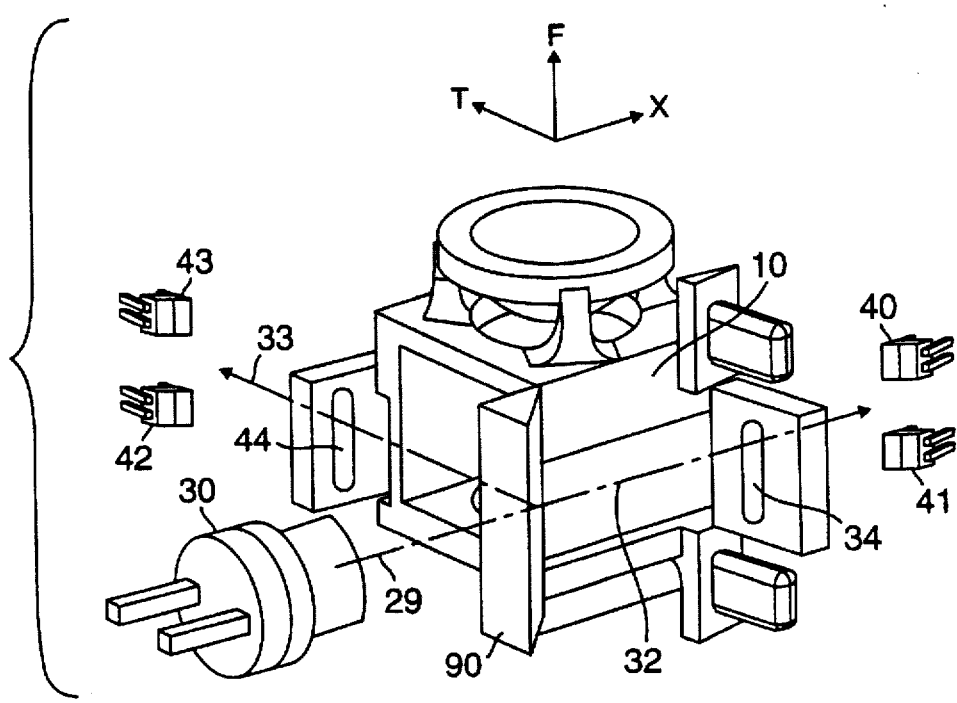
FIG. 5 is a perspective view of a lens holder having two tilt sensors with a single light source according to the invention.

FIG. 5 shows an embodiment of the invention using a single light source for both the roll sensor and the pitch sensor. A 90° beam-splitting prism 90 is fixed to the actuator base (not shown) in the beam path 29 from the LED 30. Part 32 of the beam passes through the prism without being reflected, passes along the tangential axis X of the lens holder 10 and strikes roll detectors 40 and 41, projecting the image of the roll sensor slot 34. Another part 33 of the beam is reflected 90° to pass along the tracking axis T of the lens holder and strikes pitch detectors 42 and 43, projecting the image of the pitch sensor slot 44. Position and tilt for each of the axes is computed in the manner explained above.

Figure 6:
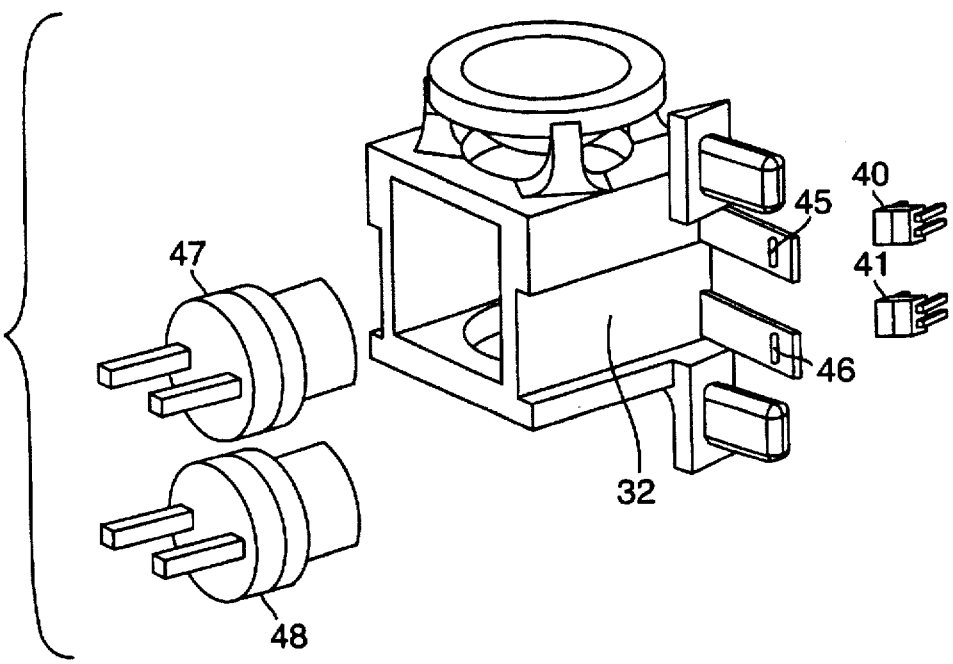
FIG. 6 is a perspective view of a lens holder having a tilt sensor according to the invention with two light sources and two optical slots.

FIG. 6 shows an embodiment of the invention using two image masks, in this case slots 45 and 46, in the path of two light sources 47 and 48 for projecting images on the two photosensitive detectors 40 and 41, respectively. This configuration is useful where the space available within the optical recording actuator does not permit the beam path 29 from a single light source 30 (FIG. 2) to strike both photosensitive detectors. Alternatively, a single light source could be used with two image masks, or two light sources could be used with a single image mask to project images on each detector, as space and other design criteria permit.

The tilt and position information from the sensors can be used, with an appropriate actuator servo system, to control the actuator tilt in real time. The resulting easing of actuator tilt stability requirements will allow the use of materials with higher damping which can improve dynamic performance.

The foregoing is in no way a limitation on the scope of the invention which is defined by the claims.

PARTS LIST

| | |
|---|---|
| 1 | optical recording actuator |
| 2 | actuator base |
| 10 | lens holder |
| 11 | objective lens |
| 12 | aperture in lens holder |
| 13 | plastic flexures |
| 14 | flexible segments of the flexure allowing for motion in the focus direction |
| 15 | flexible segments of the flexure allowing for motion in the tracking direction |
| 16 | coil |
| 17 | coil |
| 18 | magnets |
| 19 | flux returns |
| 20 | recording disc |
| 29 | beam path |
| 30 | light emitting diode |
| 32 | part of the beam passing through the prism |
| 33 | part of the beam reflected by the prism |
| 34 | optical slot |
| 40 | detector |
| 40a | first cell of bi-cell detector 40 |
| 40b | second cell of bi-cell detector 40 |
| 41 | detector |
| 41a | first cell of bi-cell detector 41 |
| 41b | second cell of bi-cell detector 41 |
| 42 | detector |
| 43 | detector |
| 44 | optical slot |
| 45 | optical slot |
| 46 | optical slot |
| 47 | light source |
| 48 | light source |
| 50 | image of image-producing means on bi-cell detector |
| 90 | beam splitting prism |
| 100 | computing means |
| 101 | differential amplifier |
| 102 | differential amplifier |
| 103 | summing amplifier |
| 104 | differential amplifier |
| T | tracking axis |
| F | focus axis |
| X | tangential axis |
| α | lens holder tilt function |
| P | lens holder position function |
| D | distance between bi-cell detectors |

What is claimed is:

1. A sensor for measuring displacement and tilt of a lens holder movable relative to the base of an optical recording actuator, comprising:
   a light source secured to the optical recording actuator, said light source having a beam path;
   a first photosensitive detector secured to the optical recording actuator within said beam path, said first detector having an output;
   a second photosensitive detector secured to the optical recording actuator within said beam path, said second detector having an output;
   an image mask secured to the lens holder within said beam path between said light source and said detectors; and
   a computing circuit to simultaneously determine a first tilt function relative to the base from said outputs of said detectors representing the tilt of the lens holder, and a position function relative to the base from said outputs of said detectors representing the displacement of the lens holder.

2. The sensor of claim 1, wherein said light source comprises a light emitting diode.

3. The sensor of claim 1, wherein said first and second photosensitive detectors are spaced apart.

4. The sensor of claim 1, wherein:
   said output of said first detector comprises a first light intensity signal and a second light intensity signal;
   said output of said second detector comprises a third light intensity signal and a fourth light intensity signal; and
   said computing circuit subtracts a difference between said third and fourth light intensity signals from a difference between said first and second light intensity signals to determine the first tilt function, and adds said difference between said third and fourth light intensity signals to said difference between said first and second light intensity signals to determine the position function.

5. The sensor of claim 1, wherein said image mask comprises an optical slot.

6. The sensor of claim 1, wherein said image mask comprises an optical flag.

7. The sensor of claim 1, wherein said image mask comprises a first optical slot between said light source and said first detector, and a second optical slot between said light source and said second detector.

8. The sensor of claim 1, wherein said image mask comprises a first optical flag between said light source and said first detector, and a second optical flag between said light source and said second detector.

9. The sensor of claim 1, wherein said beam path is a first beam path and said image mask is a first image mask, and further comprising:
   a beam splitting means secured to the actuator base in said first beam path between said light source and said first image mask for forming a second beam path;
   a third photosensitive detector secured to the optical recording actuator within said second beam path, said third detector having an output;
   a fourth photosensitive detector secured to the optical recording actuator within said second beam path, said fourth detector having an output;
   a second image mask secured to the lens holder within said second beam path for creating an image on said third and fourth detectors;
   and wherein said computing circuit further determines a second tilt function from said outputs of said third and fourth bi-cell detectors.

10. A method for measuring the displacement and tilt of a lens holder movable relative to an optical recording actuator base, comprising:
   directing a beam from a beam source toward first and second photosensitive detectors, said beam source and said detectors being mounted to the actuator base;
   creating an image in said beam on said first and second photosensitive detectors with an image mask mounted to the lens holder, each of said detectors having an output; and simultaneously computing the lens holder tilt relative to the base from said detector outputs and the lens holder displacement relative to the base from said detector outputs.

11. The method of claim 10, wherein said image mask is an optical slot.

12. The method of claim 10, wherein said image mask is an optical flag.

13. The method of claim 10, wherein each of said detector outputs comprises a first intensity level and a second light intensity level, and the computing step comprises:

computing a first difference between said first and second light intensity levels of said first detector;

computing a second difference between said first and second light intensity levels of said second detector;

subtracting said second difference from said first difference to determine the lens holder tilt; and adding said second difference to said first difference to determine the lens holder displacement.

* * * * *